United States Patent [19]

Chatterjee

[11] 4,321,334

[45] Mar. 23, 1982

[54] MELT CRYSTALLIZATION OF BUTENE-1 POLYMERS

[75] Inventor: Ananda M. Chatterjee, Houston, Tex.

[73] Assignee: Shell Oil Company, Houston, Tex.

[21] Appl. No.: 183,869

[22] Filed: Sep. 4, 1980

[51] Int. Cl.³ ............................................. C08K 3/04
[52] U.S. Cl. ................................................... 524/579
[58] Field of Search ................... 525/1; 260/42, 42.46

[56] References Cited

U.S. PATENT DOCUMENTS

| | | | |
|---|---|---|---|
| 3,385,817 | 5/1968 | Jones | 260/42.46 |
| 3,455,871 | 7/1969 | Coover | 260/42.46 |
| 3,551,194 | 12/1970 | Shepherd | 260/42.46 |
| 3,902,532 | 9/1975 | Carrow | 260/42 |

*Primary Examiner*—Paul R. Michl

[57] ABSTRACT

A crystallizable thermoplastic composition is prepared by adding a small amount of substantially graphitic non-turbostratic carbon to an isotactic butene-1 homopolymer or copolymer with ethylene.

7 Claims, 1 Drawing Figure

MELT CRYSTALLIZATION OF BUTENE-1 POLYMERS

BACKGROUND OF THE INVENTION

This invention relates to crystallizable thermoplastic butene-1 polymers. More particularly, this invention is directed to the addition of a small amount of substantially graphitic non-turbostratic carbon to a butene-1 polymer, which affords compositions which crystallize from the melt at a faster rate and exhibit improved properties, compared to the non-nucleated butene-1 base polymer.

Heterogeneous nucleation via the addition of a foreign material or nucleating agent, which promotes crystallization of the polymers from the melt, is well known. See, for example, Chatterjee et al, *J. Polym. Sci.; Polym. Phys. Ed.*, Vol. 13, 2369-83 and 2385-90 (1975). As demonstrated therein, heterogeneous nucleation is highly selective and there is no evidence of a universally strong nucleating agent for all polymers. In other words, an effective nucleating agent for one polymer may be ineffective for even a closely related polymer; similarly, even a compound closely related to an effective nucleating agent for one polymer may be ineffective for that same polymer.

The use of a nucleating agent to accelerate crystallization allows for faster processing and results in a more uniform microstructure because of the reduced size of the spherulites which form upon melt crystallization. The products also generally demonstrate improved physical and mechanical properties. See, for example, Rubin, Injection Molding Theory and Practice, pp. 192ff (1972). In general, a desirable nucleating agent is effective at low levels of addition, both for reasons of economy and the avoidance of undue foreign structural heterogeneity which may otherwise affect the properties of the polymer. It has now been discovered that substantially graphitic non-turbostratic carbon is a highly effective nucleating agent, even at low levels of addition, for butene-1 homopolymers and copolymers with ethylene. Carbon black, an amorphous turbostratic carbon, is much less effective for nucleation of butene-1 polymers than the substantially graphitic carbon of this invention.

The row nucleation of isotactic polypropylene on graphite fibers is disclosed in Hobbs, *Nature Physical Science*, Vol. 234, No. 44, p. 12ff (Nov. 1, 1971). The graphite used is described as having a turbostratic structure and no experiments with butene-1 polymers were performed.

U.S. Pat. No. 3,902,532 discloses pipe formed from poly(1-monoolefin) compositions containing small amounts of graphite and optionally carbon black. The patent is directed mainly to ethylene polymers and no specific form of graphite is required. The graphite is used in amounts higher than have now been discovered as effective for nucleation, and is added to produce pipe with high hoop-stress life.

Belgian Pat. No. 695,803 and British Pat. No. 1,328,444 disclose a variety of nucleating agents for butene-1 polymers. Specific examples include polypropylene, coumarone-indene resin, aluminum silicate, clay and aromatic sulfonic acids.

SUMMARY OF THE INVENTION

This invention is directed to a crystallizable thermoplastic composition which comprises an isotactic butene-1 homopolymer or butene-1-ethylene copolymer having no more than about 7 mole percent of ethylene and about 0.05 to 5% by weight of substantially graphitic non-turbostratic carbon. This invention is further directed to a method of preparing a crystallizable thermoplastic composition which comprises adding substantially graphitic non-turbostratic carbon in the amount just specified to an isotactic butene-1 homopolymer or butene-1-ethylene copolymer having no more than about 7 mole percent of ethylene.

The graphitic carbon used is a highly effective nucleating agent at surprisingly low levels of addition. By promoting the more rapid crystallization of butene-1 polymers from the melt, it allows for faster processing and results in a product with a uniform microstructure. Corresponding improvements may also occur in physical and mechanical properties over non-nucleated polymers or polymers nucleated with, for example, carbon black.

DESCRIPTION OF THE PREFERRED EMBODIMENTS

Figure 1:
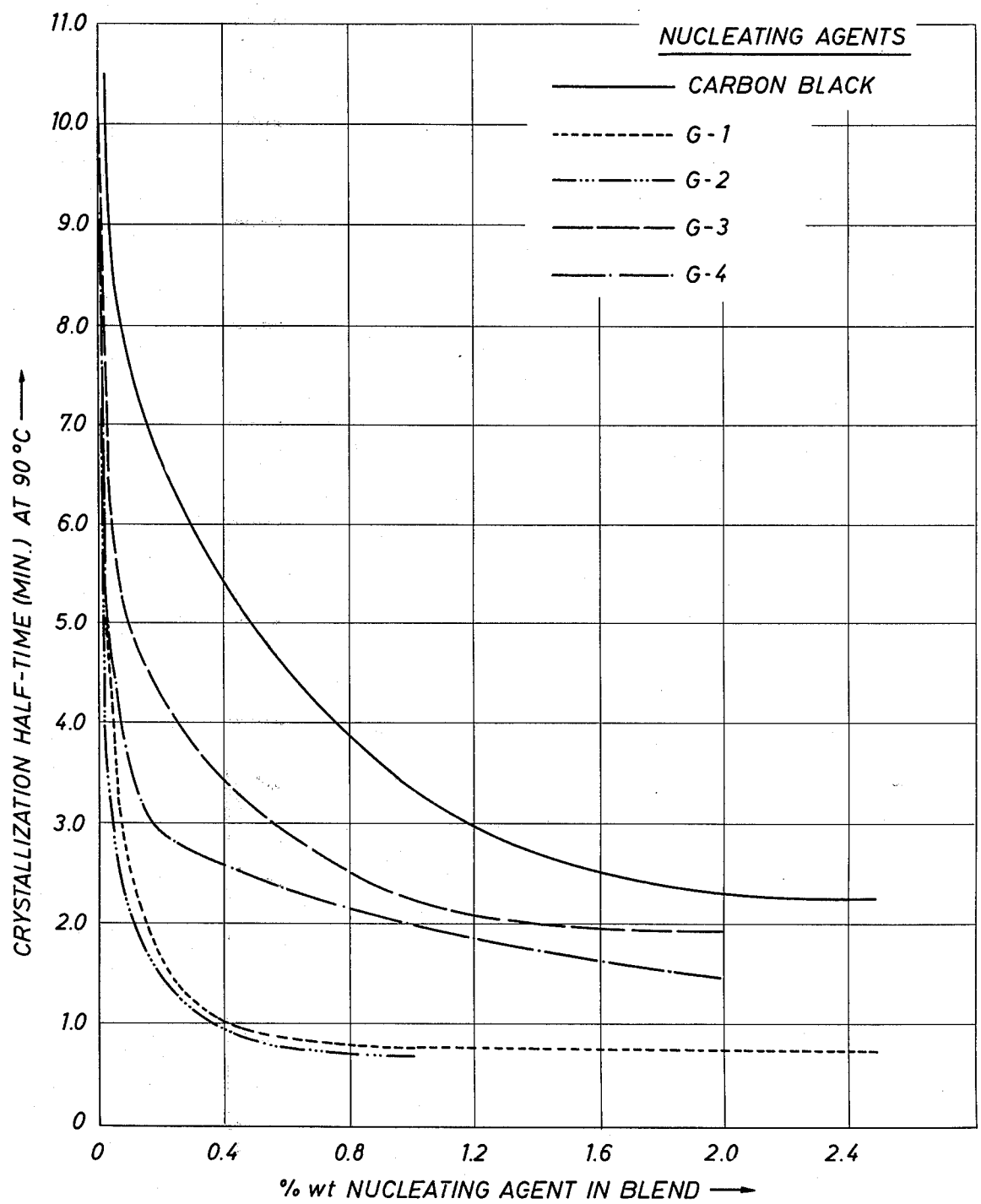
FIG. 1 is a graph showing the crystallization half-times for a butene-1 homopolymer containing carbon black or a substantially graphitic non-turbostratic carbon as a nucleating agent.

The butene-1 polymer component used in the thermoplastic composition comprises an isotactic butene-1 homopolymer (polybutylene) or an isotactic butene-1-ethylene copolymer. The polymers used are suitably crystallizable thermoplastic butene-1 polymers with number average molecular weights above 15,000, preferably above 20,000, and an isotactic content above 85%, preferably above 90%, and more preferably above 95%, determined as the diethyl ether insoluble component. Suitable butene-1-ethylene copolymers contain from about 0.1 to 7 mole percent, preferably from about 0.5 to 5 mole percent and more preferably from about 1 to 4 mole percent, of ethylene. The butene-1-ethylene copolymers are typically more difficult to crystallize at the same temperature. Suitable isotactic butene-1 polymers are commercially available and methods for their preparation are well known in the art, as shown in, for example, U.S. Pat. No. 3,362,940. Illustrative of butene-1 polymers suitable for use in the present invention (if the above requirements are met) are those known in the industry as pipe, film or molding grades.

The nucleating agent added to the butene-1 polymer comprises substantially graphitic non-turbostratic carbon. Two of the allotropic forms of carbon are commonly known as graphite and carbonblack (amorphous carbon). As described in Kirk-Othmer, Encyclopedia of Chemical Technology, Vol. 4, pp. 304-309 (2nd Ed. 1964), an ideal graphite contains layers of carbon atoms stacked in a three-dimensional ordered spacing. On the other hand, in amorphous carbons these layers assume progressively random, although parallel, positions with respect to each other: a two-dimensional ordering known as a turbostratic structure. A range of intermediate structures lies between these extremes; a variety of tests are used to measure the degree of graphitization. See, Blackman, Modern Aspects of Graphite Technology pp. 2-18 (1970). One such test measures the interlayer spacing or d spacing; since the planes are further apart in turbostratic carbons, the d spacing decreases from the turbostratic value of 3.44 Angstroms (Å) toward the graphitic value of 3.3538 Å as the degree of graphitization increases. The nucleating agent of this invention is thus characterized according to the preceding discussion as possessing a three-dimensional ordering of structure (non-turbostratic). The nucleating agent is further characterized as substantially graphitic; as used herein, substantially graphitic defines a carbon with a d spacing range from 3.3538 Å (completely graphitic) to about 3.40 Å. The range given for d spacing is believed to correspond to a graphitization percentage of 100% to about 25%. Non-turbostratic carbon with a d spacing of from 3.3538 to about 3.39 Å is preferred, with 3.3538 to about 3.38 Å more preferred. The non-turbostratic carbon used may be naturally occurring or synthetic.

The substantially graphitic non-turbostratic carbon is added to the butene-1 homopolymer in an amount of from about 0.05 to 5.0% by weight, preferably from about 0.1 to 2.5% by weight and more preferably from about 0.1 to 0.45% by weight of the polymer-nucleant blend. The substantially graphitic non-turbostratic carbon is added to the butene-1-ethylene copolymer in an amount of from about 0.05 to 5.0% by weight, preferably from about 0.2 to 3.0% by weight and more preferably from about 0.5 to 3.0% by weight of the polymer-nucleant blend. Typically, as illustrated by FIG. 1, the crystallization rate rises and eventually tends to level off with increasing concentrations of the nucleating agent. This levelling off occurs at lower concentrations with more effective nucleating agents. In general, a more effective nucleating agent may be used in lower amounts to achieve a given nucleating effect. Preferred amounts of addition of the substantially graphitic non-turbostratic carbon will therefore depend in part on its quality (degree of graphitization and purity) as balanced against cost; avoidance of undue structural heterogeneity from the additive and the desired crystallization rate, properties and end use of the finished composition are further considerations. A finely divided or powdered graphite is preferred.

This invention is also directed to a method of preparing a crystallizable thermoplastic composition which comprises adding, in the respective amounts described above, a substantially graphitic non-turbostratic carbon to an isotactic butene-1 homopolymer or butene-1-ethylene copolymer having no more than about 7 mole percent of ethylene. The method used to mix the components is not critical so long as the non-turbostratic carbon is well dispersed in the butene-1 polymer; conventional mixing equipment can be used, for example, a Brabender mixing head, single-screw or twin-screw extruder or Banbury mixer.

For convenience, various conventional fillers, stabilizers, processing agents, pigments and/or other materials can be added if desired at the same time as the non-turbostratic carbon nucleating agent. Such materials can, but need not necessarily be, non-carbonaceous. The nucleating agent of this invention may be used, if desired, with other known nucleating agents for butene-1 polymers, for example, the aromatic sulfonic acids disclosed in British Pat. No. 1,328,444. As another example, carbon black, a relatively weak nucleating agent which also acts as a pigment and ultraviolet stabilizer, can be added with the non-turbostratic carbon of the invention to polymers for which an end use involving exposure to sunlight is contemplated, e.g. pipe. The non-turbostratic carbon of the invention may also occur in a form containing non-carbonaceous materials, for example, siliceous materials. In this event, it is understood that it is the carbonaceous portion which is required to be substantially graphitic; it is further understood that the non-carbonaceous portion is excluded when calculating the amount of substantially graphitic carbon added as the nucleating agent.

The finished thermoplastic composition may be used in various fabrication equipment, including extrusion, thermoforming, blow molding, rotomolding, injection molding and other molding equipment, for the manufacture of pipe, film, molded articles and other items. Generally, butene-1 homopolymer is the polymer preferred for the manufacture of pipe and butene-1-ethylene copolymer is preferred for the manufacture of film. The composition crystallizes quickly and uniformly from the melt, allowing for increased speed of processing. Improvements in physical and mechanical properties of the finished items are achieved; for example, improved tensile properties, less brittleness and/or increased resistance to cracking are exhibited by thick-walled pipe prepared from the thermoplastic compositions of the invention.

The invention is illustrated further in the following examples, which are not to be construed as limiting its scope. In the examples, the butene-1 polymers are denoted as follows:

PB-A: pipe grade butene-1 homopolymer with melt index of 0.35 dg/min and number average molecular weight of 73.300

PB-B: butene-1-ethylene copolymer (1.5 mole % ethylene) with melt index of 0.91 dg/min and number average molecular weight of 60,000

PB-C: butene-1-ethylene copolymer (8 mole % ethylene) with melt index of 0.2 dg/min and number average molecular weight of 91,200 ASTM D-1238 Condition E was used to measure the stated melt indices. The blends of the butene-1 polymer and the nucleating agent were prepared by mixing in a Brabender mixing head at 175° C., 60 RPM for 5 minutes, with a nitrogen purge to prevent oxidative degradation. Nucleating efficiency was compared in two ways: the isothermal crystallization half-time and the crystallization temperature. The crystallization half-time ($t_{\frac{1}{2}}$) in minutes was measured at a constant temperature using a differential scanning calorimeter: 90° C. for PB-A, 75° C. for PB-B and 40° C. for PB-C. Prior to isothermal crystallization, the samples were melted at 150° C. and cooled to the specific measurement temperature at the rate of 10° C. per minute. The crystallization temperature ($T_c$) in ° C. was measured under constant cooling rate conditions using a differential scanning calorimeter. The samples were melted at 150° C. and then cooled at the rate of 10° C. per minute; the temperature corresponding to the exothermic crystallization peak was taken as $T_c$. A lower $t_{\frac{1}{2}}$ or a higher $T_c$ for a given polymer indicates a better nucleating agent. The carbon black used as a control was a furnace black marketed as Sterling NS by Cabot Corporation.

The substantially graphitic non-turbostratic carbons used in the examples are denoted as follows:

G-1: high quality purified product with maximum ash of 0.2%; screen analysis of 98.5% minimum through 200 mesh screen; d spacing of 3.376 Å; stack height of 204 Å (marketed as GP-195 graphite by Union Carbide Corporation)

G-2: high quality product with maximum ash of 0.2%; screen analysis of 98.5% minimum through 200 mesh screen; d spacing of 3.363 Å; stack height of 191 Å (marketed as GP-170 graphite by Union Carbide Corporation)

G-3: intermediate quality product with maximum ash of 15%; screen analysis of 100% through 10 mesh and 40% minimum through 35 mesh screens; d spacing of 3.363 Å; stack height of 333 Å (marketed as GP-20 graphite by Union Carbide Corporation)

G-4: secondary product with maximum ash of about 25% (principally silica); screen analysis of 60–90% through 200 mesh screens; d spacing of 3.363 Å; stack height of 643 Å (marketed as PD-2 by Union Carbide Corporation)

The stack height (apparent layer plane height) was calculated from the width at half-height of the 002 reflection in a wide angle X-ray diffraction scan.

EXAMPLE I

In this series of experiments, the nucleating efficiencies of the three substantially graphitic non-turbostratic carbons were tested with a butene-1 homopolymer (PB-A). The results are shown below in Table I and plotted in FIG. 1. The crystallization half-times are averages of duplicate measurements which agreed closely. Values of $t_{\frac{1}{2}}$ and $T_c$ for non-nucleated and carbon black (CB) nucleated butene-1 homopolymer are given for comparison purposes (examples I-1 to I-5). It may be observed that the three non-turbostratic carbons tested were substantially more effective nucleating agents for butene-1 homopolymer than carbon black; less than 0.15% of G-1 shows the same nucleating effect as 2.5% of carbon black. Although G-4 contains a higher proportion of non-carbonaceous materials, it showed a better nucleating effect than G-3; this result is believed to follow from the fact that the graphitic portion of G-4 exhibits a high degree of graphitization, as indicated by its low d spacing value.

TABLE I

| | Nucleation of Butene-1 Homopolymer | | |
|---|---|---|---|
| Example | Nucleant | $t_{\frac{1}{2}}$ (min) at 90° C. | $T_c$ (°C.) |
| I-1 | none | 10.1 | 65.0 |
| I-2 | 0.01% CB | 10.43 | 68.6 |
| I-3 | 0.1% CB | 7.53 | 72.8 |
| I-4 | 1.0% CB | 3.28 | 73.3 |
| I-5 | 2.5% CB | 2.23 | 77.4 |
| I-6 | 0.1% G-1 | 3.29 | 73.5 |
| I-7 | 0.2% G-1 | 1.65 | 78.0 |
| I-8 | 0.4% G-1 | 1.0 | 80.4 |
| I-9 | 1.0% G-1 | 0.75 | 82.8 |
| I-10 | 2.5% G-1 | 0.77 | 82.7 |
| I-11 | 0.2% G-2 | 1.44 | 79.0 |
| I-12 | 0.5% G-2 | 0.83 | 82.5 |
| I-13 | 1.0% G-2 | 0.69 | 84.0 |
| I-14 | 0.1% G-3 | 5.22 | 71.0 |
| I-15 | 1.0% G-3 | 2.23 | 76.5 |
| I-16 | 2.0% G-3 | 1.88 | 76.5 |
| I-17 | 0.2% G-4 | 2.90 | 78.5 |
| I-18 | 0.4% G-4 | 2.55 | 75.2 |
| I-19 | 2.0% G-4 | 1.37 | 79.7 |

EXAMPLE II

In this series of experiments, the nucleating efficiency of G-1 non-turbostratic carbon was tested with butene-1-ethylene copolymers. The results are shown below in Table II. Values of $t_{\frac{1}{2}}$ and $T_c$ for the non-nucleated copolymers are given for comparison purposes (Examples II-1 and II-5). A comparison with the results obtained in Example I demonstrates that higher levels of the nucleating agent must be added to butene-1 copolymers than butene-1 homopolymers to achieve a substantial nucleating effect. It may also be observed that it is more difficult to nucleate the crystallization of the butene-1-ethylene copolymer (PB-C) with a higher ethylene content (not according to the invention). The data show that when the ethylene content in the copolymer is at the 8 mole percent level of PB-C, the G-1 non-turbostratic carbon exhibits only a marginal nucleating effect, again illustrating the selectivity of a given nucleant.

TABLE II

| | Nucleation of Butene-1 Copolymers | | | |
|---|---|---|---|---|
| | | $t_{\frac{1}{2}}$ (min) | | |
| Example | Formulation | 75° C. | 40° C. | $T_c$ (°C.) |
| II-1 | PB-B | 8.3 | — | 46.8 |
| II-2 | PB-B + 0.2% G-1 | 4.0 | — | 47.7 |
| II-3 | PB-B + 0.5% G-1 | 2.0 | — | 58.5 |
| II-4 | PB-B + 1.0% G-1 | 1.3 | — | 61.6 |
| II-5 | PB-C | — | 4.8 | 10.5 |
| II-6 | PB-C + 0.2% G-1 | — | 4.5 | 13.0 |
| II-7 | PB-C + 0.5% G-1 | — | 4.7 | 13.6 |
| II-8 | PB-C + 1.0% G-1 | — | 4.8 | 12.0 |

What is claimed is:

1. A crystallizable thermoplastic composition which comprises an isotactic butene-1 homopolymer and about 0.05 to 0.45% by weight of substantially graphitic non-turbostratic carbon.

2. A composition as defined in claim 1, wherein the composition contains about 0.1 to 0.45% by weight of substantially graphitic non-turbostratic carbon.

3. A crystallizable thermoplastic composition which comprises an isotactic butene-1-ethylene copolymer having no more than about 7 mole percent of ethylene and about 0.05 to 0.45% by weight of substantially graphitic non-turbostratic carbon.

4. A composition as defined in claim 3, wherein the composition contains about 0.2 to 0.45% by weight of substantially graphitic non-turbostratic carbon.

5. A method of preparing a crystallizable thermoplastic composition which comprises adding about 0.05 to 0.45% by weight of substantially graphitic non-turbostratic carbon to an isotactic butene-1 homopolymer.

6. A method of preparing a crystallizable thermoplastic composition which comprises adding about 0.05% to 0.45% by weight of substantially graphitic non-turbostratic carbon to an isotactic butene-1-ethylene copolymer having no more than about 7 mole percent of ethylene.

7. The method as defined in claim 6, wherein about 0.2 to 0.45% by weight of substantially graphitic non-turbostratic carbon is added to the copolymer.

* * * * *